(12) United States Patent
Harwood et al.

(10) Patent No.: US 7,010,620 B1
(45) Date of Patent: Mar. 7, 2006

(54) NETWORK ADAPTER HAVING INTEGRATED SWITCHING CAPABILITIES AND PORT CIRCUITRY THAT MAY BE USED IN REMOTE MIRRORING

(75) Inventors: Jack Harwood, Paxton, MA (US); David Kendler, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 755 days.

(21) Appl. No.: 10/010,778

(22) Filed: Dec. 6, 2001

(51) Int. Cl.
*G06F 15/16* (2006.01)

(52) U.S. Cl. ............... 709/250; 709/220; 709/230; 710/316

(58) Field of Classification Search ........... 709/250, 709/223, 230, 220; 710/316
See application file for complete search history.

(56) References Cited

U.S. PATENT DOCUMENTS

| 6,385,364 B1 * | 5/2002 | Abushagur | 385/16 |
| 6,542,954 B1 * | 4/2003 | Aruga | 710/316 |
| 6,542,961 B1 * | 4/2003 | Matsunami et al. | 711/114 |
| 6,643,795 B1 * | 11/2003 | Sicola et al. | 714/6 |
| 6,792,174 B1 * | 9/2004 | Ramaswami | 385/17 |
| 2001/0046235 A1 * | 11/2001 | Trevitt et al. | 370/412 |

* cited by examiner

*Primary Examiner*—Philip B. Tran
(74) *Attorney, Agent, or Firm*—Krishnendu Gupta, Esq.; Jason A. Reyes, Esq.

(57) ABSTRACT

According to one embodiment of the present invention, a network adapter is provided that may be used to interface to a network environment a first data storage system. The adapter includes a switching system that may be coupled to data exchanging devices in the network environment, and port circuitry that may be used to facilitate establishment of a link between the first data storage system and a second, remote data storage system in the network environment. The link, when established, may facilitate the establishment of a target device in the second data storage device as a mirror device that may comprise a mirror of data residing in a source device in the first network data storage system.

16 Claims, 6 Drawing Sheets

NETWORK ADAPTER HAVING INTEGRATED SWITCHING CAPABILITIES AND PORT CIRCUITRY THAT MAY BE USED IN REMOTE MIRRORING

CROSS-REFERENCE TO RELATED APPLICATIONS

The subject application is related to co-pending U.S. patent application Ser. No. 09/877,810, filed Jun. 7, 2001, entitled "Data Storage System With Integrated Switching," and is also related to co-pending U.S. patent application Ser. No. 09/767,773, filed Jan. 23, 2001, entitled "Remote Mirroring In A Switched Environment"; each of said co-pending Applications is owned by the owner of the subject application and is hereby incorporated herein by reference in its respective entirety.

FIELD OF THE INVENTION

The present invention relates generally to a network adapter (and a method of using same) that may be used in a network data storage system, and more specifically, to such a network adapter (and method of using same) that has integrated switching capabilities and port circuitry and may be used to facilitate remote mirroring of data stored in the network data storage system.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network data storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network data storage subsystem, manufactured and sold by the Assignee of the subject application (hereinafter "Assignee") under the tradename Symmetrix™ (hereinafter "the Assignee's conventional storage system"), includes a plurality of disk mass storage devices configured as one or more redundant arrays of independent (or inexpensive) disks (RAID). The disk devices are controlled by back-end I/O controllers (commonly referred to as "back end" directors) that are coupled to a shared cache memory resource in the subsystem. The cache memory resource is also coupled to a plurality of front-end I/O controllers (commonly referred to as "front end" directors). The back-end controllers are coupled to respective disk adapters that, among other things, interface the back-end controllers to bus systems (e.g., small computer system interface (SCSI) based bus systems) used to couple the disk devices to the back-end controllers. Similarly, the front-end controllers are coupled to respective host channel/network adapters that, among other things, interface the front-end controllers via channel input/output (I/O) ports to the network communications channels (e.g., Gigabit Ethernet, SCSI, Enterprise Systems Connection (ESCON), or Fibre Channel (FC) based communications channels) that couple the storage subsystem to computer nodes in the computer network external to the subsystem (commonly termed "host" computer nodes or "hosts").

In one conventional data storage network arrangement, a standalone network switch may be interjected in the communications channels intermediate to the host adapter I/O ports and the host nodes. More specifically, the host adapter channel I/O ports may be coupled to a first set of the switch's I/O ports, and a second set of the switch's I/O ports may be coupled to the host nodes. In this conventional data storage network arrangement, if the standalone network switch is appropriately configured, the host adapters (and their associated front-end controllers) may be able to exchange data/commands via the switch with any of the host nodes.

Additionally, conventional techniques have been developed to provide enhanced reliability and availability of data stored in the data storage network. One of these techniques is a data "mirroring" technique that involves the including in the data storage network of at least one geographically separated redundant pair of network data storage systems (e.g., a redundant pair of the Assignee's conventional data storage systems). According to this data mirroring technique, the data stored in one of the storage systems (hereinafter termed a "source" storage system) in a given redundant pair of storage systems may be replicated (or "mirrored") in the other, storage system (hereinafter termed a "target" storage system) in that redundant pair of storage systems. If one of the storage systems in a given redundant pair fails, the mirror copy of the data that was stored in the failed storage system may be obtained from the other storage system in the redundant pair.

In a given redundant pair of storage systems, the one or more logical volumes in a source storage system that are mirrored in the target storage system may be referred to as a "source device group"; similarly, in a given redundant pair, the corresponding one or more logical volumes in the target storage system that serve or mirror these one or more logical volumes in the source storage system may be referred to as a "target device group." Such device groups may span a number of physical and/or logical volumes, and in some instances (e.g., when data striping is used), several device groups may be mapped to different portions of physical or logical volumes.

Typically, in each respective redundant pair of storage systems, the source storage system may comprise a respective dedicated adapter that may be connected by a respective logical communication link to a respective dedicated adapter comprised in the target storage system. Each such respective logic communication link may comprise two respective dedicated communication channels (e.g., FC or ESCON communication channels); one of these two respective dedicated, physical communication channels may be a respective "primary" communication channel that may support (so long as the respective primary communication channel is functioning normally) write and read operations necessary to implement data mirroring-related operations (e.g., data mirroring and recovery operations) involving the respective redundant pair of storage systems, and the other of these two respective dedicated communication channels may be a respective "secondary" or fault-tolerant communication channel that may support such write and read operations in the event of failure of the respective primary communication channel.

As stated above, in this conventional data mirroring technique, each such logical communication link requires the use of a respective pair of dedicated adapters (i.e., one respective dedicated adapter in each of the redundant storage systems connected by the link). Unfortunately, heretofore, these dedicated adapters have not been configured to perform or support data transfer and storage-related operations in addition to those required to carry out data mirroring-related operations. Also unfortunately, in the above-described types of conventional data storage network arrangements that include one or more standalone network switches, the standalone network switches have tended to be relatively expensive and complex devices that may require substantial amounts of time and effort to install, configure, manage, and maintain in the data storage network.

SUMMARY OF THE INVENTION

In accordance with the present invention, a network adapter and method of using same are provided that overcome the aforesaid and other disadvantages and drawbacks of the prior art. In one embodiment of the present invention, a network adapter is provided that may be used in a first network data storage system to interface the first network data storage system to a data storage network environment. The network environment may include external data exchanging devices (e.g., host and/or client computer nodes) and a second network data storage system. Each of these network data storage systems may comprise a respective set of mass storage devices (e.g., disk mass storage devices) that may store data that may be organized in one or more respective logical volumes.

The network adapter in the first network data storage system may facilitate data communication among the external data exchanging devices, the second network data storage system, and an I/O controller residing in the first network data storage system. The adapter may include one or more interfaces that may be physically coupled to a signal transmission medium/system (e.g., an electrical backplane) in the first network data storage system. The backplane may be coupled to the controller, and may be configured to permit data communication between the controller and the adapter when the interfaces are coupled to the backplane.

The adapter includes an integrated switching system (e.g., an FC switching fabric) that may be coupled to the data exchanging devices and to the controller when the one or more interfaces are coupled to the backplane. The adapter also includes port circuitry (e.g., I/O port circuiting) that may be used to facilitate the establishment of a logical communication link between the first network data storage system and the second network data storage system.

The logical communication link may be designed to permit the first and second network data storage systems to operate as a redundant pair of network data storage systems in which the second network data storage system may store one or more mirrored copies of one or more logical volumes stored in the first network data storage system. More specifically, in this embodiment, the logical communication link, when established, may facilitate the establishment of a target device (e.g., a target device group) in the second network data storage system, as a data mirroring device that may comprise a mirror or copy of data residing in a corresponding source device (e.g., a corresponding source device group) in the first network data storage system; the logical communication link, when established, may also facilitate data transmission from the source device to the target device. The source device and the target device may comprise one or more respective logical volumes. The first network data storage system may be geographically remote and separated from the second network data storage system.

The adapter may be embodied as an electrical circuit card that may be configured to be inserted into and received by a circuit card slot in the backplane in the data storage system. When the circuit card is inserted into and received by the slot, the card may be electrically and mechanically coupled to the backplane in the data storage system such that the one or more interfaces of the card are electrically coupled to the backplane.

In summary, a network adapter according to the present invention includes an integrated switching system, as well as, port circuitry that may be used to facilitate the establishment of a logical communication link that may be used in data mirroring-related operations. The adapter may be configured for insertion into a network data storage system, and when inserted into the network data storage system, one or more interfaces comprised in the adapter may be coupled to a signal transmission medium in the data storage system. When the one or more interfaces are so coupled to the signal transmission medium, an I/O controller in the data storage system may be able to exchange data with the adapter via the medium, and the integrated switching system may be used facilitate communication among external data exchanging devices (e.g., host computer nodes) and the controller in the data storage system.

As a result of the integrated switching capabilities of the network adapter of the present invention, in contrast to the aforedescribed conventional data storage network configuration, a data storage network that is appropriately configured with one or more of the network adapters of the present invention may not require a standalone switching system intermediate to the data storage system and host nodes. Advantageously, this may permit the cost and complexity of a data storage network wherein the present invention is practiced to be reduced, and may reduce the amount of time and effort required to configure, manage, and maintain such a data storage network. Further advantageously, by integrating switching functions into the network adapters of the present invention, there may be less processing overhead dedicated to managing and executing switching operations in the data storage network compared to the prior art.

Additionally, since the network adapter of the present invention includes integrated network switching capabilities, as well as, port circuitry that may be used to facilitate data mirroring-related operations, the network adapter of the present invention may perform/support data transfer and storage related operations in addition to those required to carry out data mirroring-related operations. Advantageously, this enhances the utility of network adapters made according to the present invention when compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
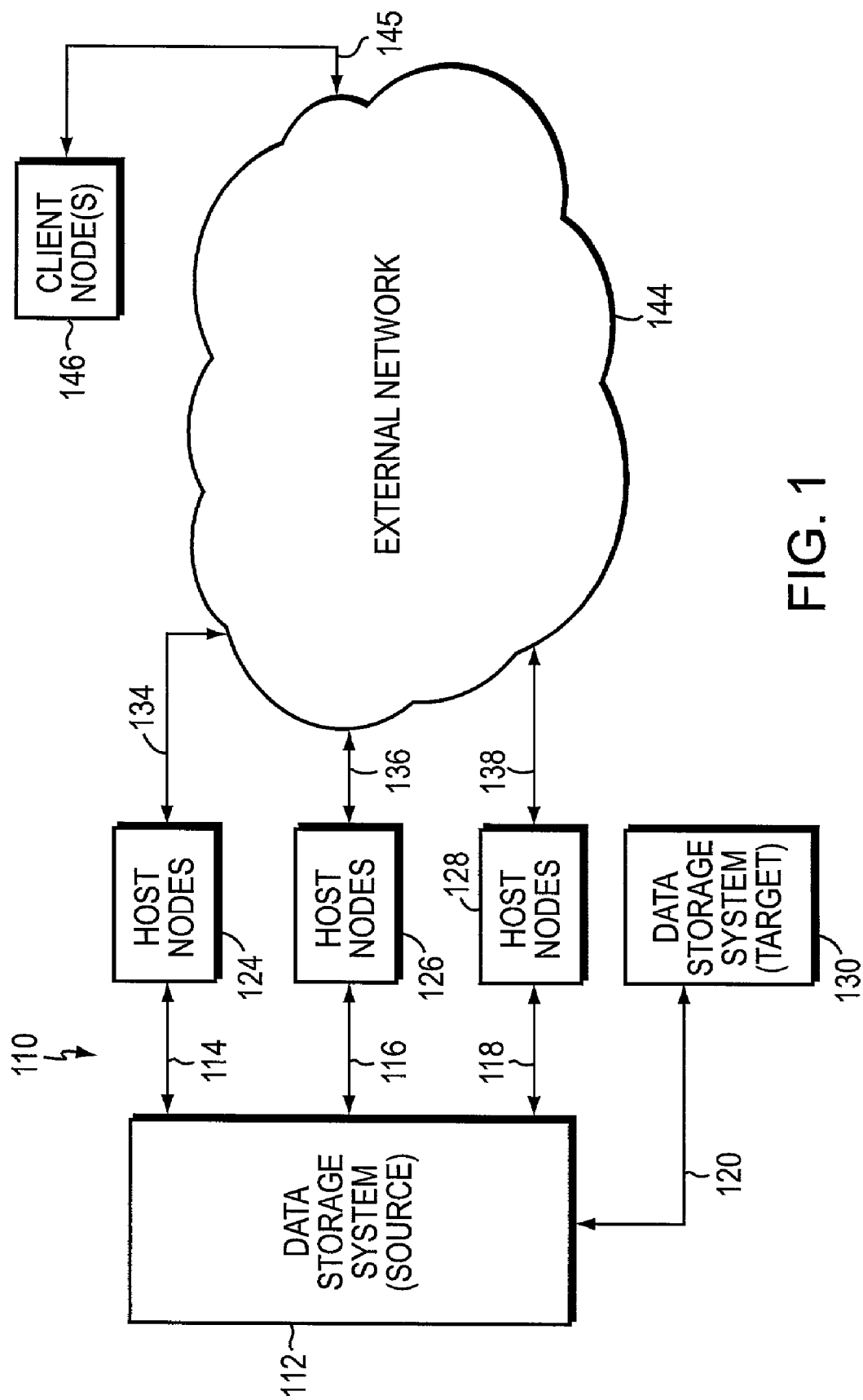
FIG. 1 is a high-level functional schematic block diagram of a data storage network that includes a network data storage system having a network adapter made according to one embodiment of the present invention.

Turning now to FIGS. 1–6, illustrative embodiments of the present invention will be described. FIG. 1 is a high-level block diagram illustrating a data storage network 110 that includes a first data storage system 112 that is coupled via respective FC protocol optical communication links (collectively referred to by numerals 114, 116, 118) to host computer nodes 124, 126, 128. Host nodes 124, 126, 128 are also coupled via additional respective conventional network communication links (collectively referred to by numerals 134, 136, 138) to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138 and 145 are selected so as to ensure that the nodes 124, 126, 128 may exchange data and commands with the nodes 146 via network 144.

Host nodes may be any one of several well known types of computer nodes, such as server computers, workstations, or mainframes. Alternatively, or in addition thereto, some or all of the host nodes may be or comprise intermediate network computer stations, such as routers, switches, bridges, etc. In general, each of the host nodes 124, 126, 128 and client nodes 146 comprises a respective computer-readable memory (not shown) for storing software programs and data structures associated with, and for carrying out the functions and operations described herein as being executed by these nodes 124, 126, 128 and 146. In addition, each of the nodes 124, 126, 128 and 146 further includes one or more respective processors (not shown) and network communication devices for executing these software programs, manipulating these data structures, and for permitting and facilitating exchange of data and commands among the host nodes 124, 126, and 128, and client nodes 146 via the communication links 134, 136, and 138, network 144, and links 145. The execution of the software programs by the processors and network communication devices included in the hosts 124, 126, and 128 also permits and facilitates exchange of data and commands among the nodes 124, 126, and 128 and the system 112 via the FC links 114, 116, and 118 in the manner that will be described below.

In addition to the data storage system 112, the data storage network 110 also includes a second data storage system 130. In network 110, the data storage systems 112 and 130 are geographically remote from each other and constitute a redundant pair of network data storage systems in which system 112 is a source data storage system and system 130 is a target data storage system. As is described below, logical link 120 couples the systems 112 and 130 in order to facilitate data mirroring-related operations, involving the systems 112 and 130, in the network 110.

Figure 2:
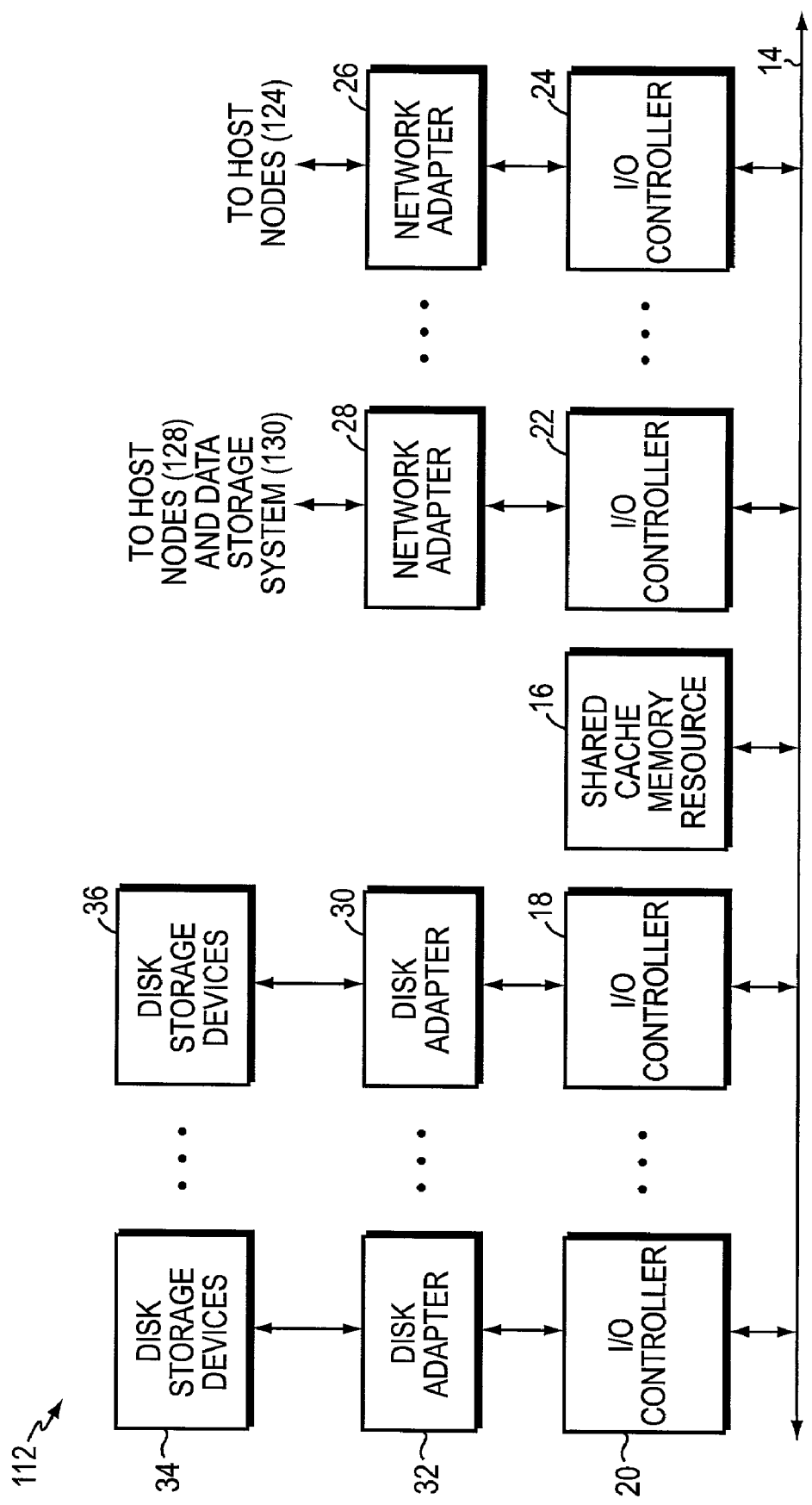
FIG. 2 is a high-level functional schematic block diagram illustrating functional components of the network data storage system included in the data storage network shown in FIG. 1.

FIG. 2 is a high-level schematic block diagram of functional components of the system 112. System 112 may include a bus system 14 that electrically couples together a plurality of front-end I/O controllers 22 . . . 24, a plurality of back-end I/O controllers 18 . . . 20, and a shared cache memory resource 16. Bus system 14 may include a plurality of redundant buses (not shown) and bus arbitration, termination, and control systems (also not shown).

Figure 3:
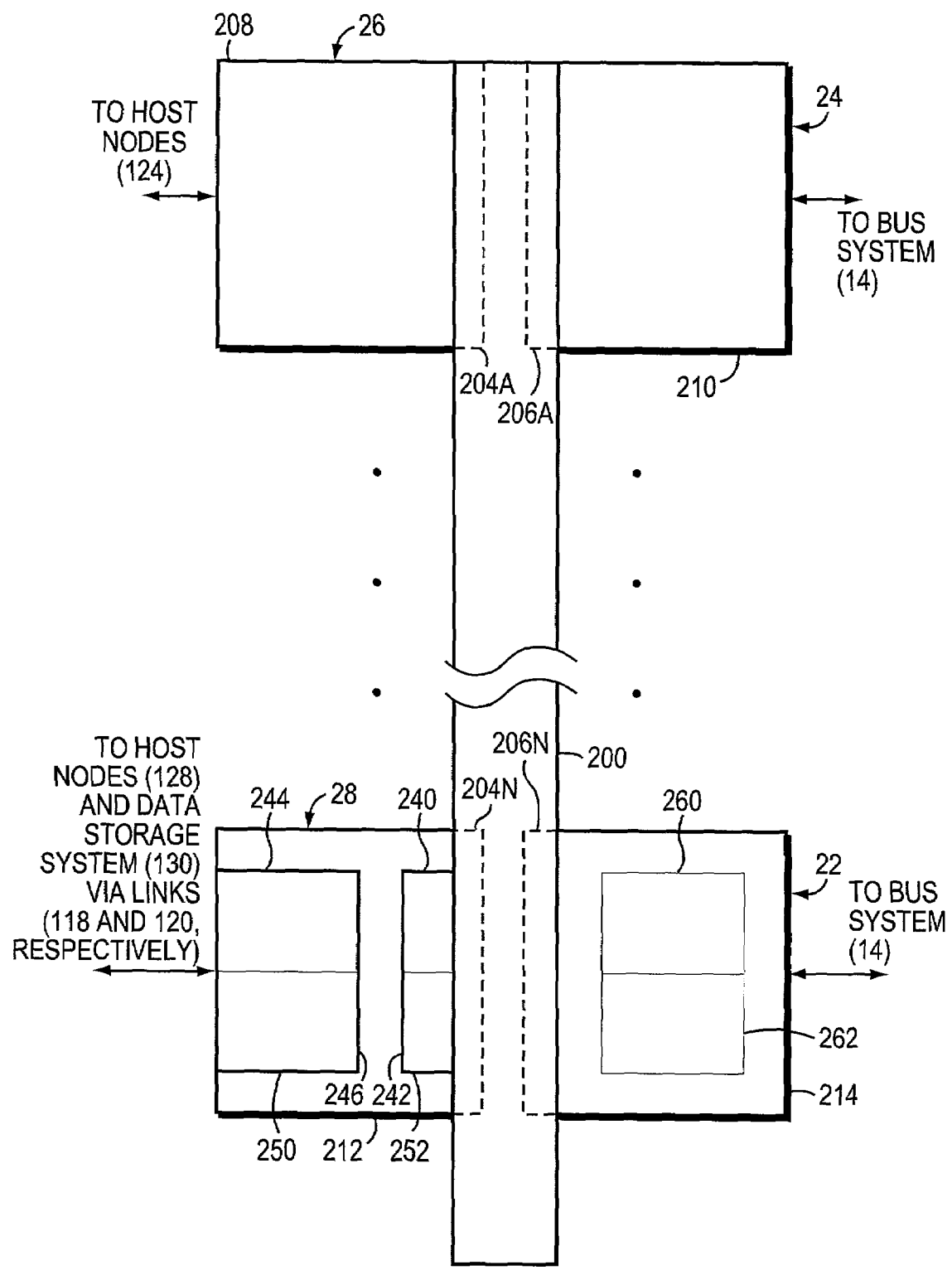
FIG. 3 is a high-level schematic block diagram illustrating the manner in which a network adapter made according to one embodiment of the present invention may be coupled to an electrical backplane in the network data storage system illustrated in FIG. 2.

Each front-end controller 22 . . . 24 may comprise a single respective electrical circuit card or panel. For example, as is shown in FIG. 3, the controllers 22, 24 may each comprise a single respective electrical circuit card or panel 214, 210. Likewise, each back-end controller 18 . . . 20 may comprise a single respective electrical circuit card or panel. Each disk adapter 30 . . . 32 may comprise a single respective electrical circuit card or panel. Likewise, each network adapter 26 . . . 28 may comprise a single respective electrical circuit card or panel. For example, as is shown in FIG. 3, the network adapters 26, 28 may each comprise a single respective electrical circuit card or panel 208, 212. Each front-end I/O controller may be electrically and mechanically coupled to a respective network adapter via a respective mating electromechanical coupling system, which system is described more fully below.

In this embodiment of system 112, although not shown explicitly in the Figures, each of the network adapters 26 . . . 28 may be coupled via a respective plurality of FC links 114, 116, or 118 to a respective plurality of host nodes 124, 126, or 128. For example, network adapter 26 may be coupled via respective FC links 114 to four host nodes 124, and network adapter 28 may be coupled via respective FC links 118 either to twelve or twenty host nodes 128. It should be appreciated that the number of host nodes to which each network adapter 26 . . . 28 may be coupled may vary, depending upon the particular configurations of the network adapters 26 . . . 28, and front-end controllers 22 . . . 24, without departing from this embodiment of the present invention.

Disk adapter 32 is electrically coupled to a set of mass storage devices 34, and interfaces the back-end controller 20 to those devices 34 so as to permit exchange of data and commands between processors (not shown) in the controller 20 and the storage devices 34. Disk adapter 30 is electrically coupled to a set of mass storage devices 36, and interfaces the back-end controller 18 to those devices 36 so as to permit exchange of data and commands between processors (not shown) in the back-end controller 18 and the storage devices 36. The devices 34, 36 may be configured as redundant arrays of conventional disk mass storage devices. It should be understood, however, that if system 112 is appropriately modified in ways apparent to those skilled in the art, mass storage devices 34, 36 may comprise optical, solid state, or other types of memory devices without departing from the present invention.

It should be appreciated that the respective numbers of the respective functional components of system 112 shown in FIG. 2 are merely for illustrative purposes, and depending upon the particular application to which the system 112 is intended to be put, may vary without departing from the present invention. For example, it may be desirable to permit the system 112 to be capable of failover fault tolerance in the event of failure of a particular component in the system 112. Thus, in practical implementation of the system 112, it may be desirable for system 112 to include redundant functional components and mechanisms for ensuring that the failure of any given functional component is detected and the operations of any failed functional component are assumed by a respective redundant functional component of the same type as the failed component.

The general manner in which the client nodes 146 may retrieve data from, and store data in the system 112 will now be described. Broadly speaking, in operation of system 110, a client node 146 may forward a request to retrieve data to a host node (e.g., one host node comprised in the group of host nodes 124, hereinafter termed "the retrieving host node") via one of the links 145 associated with the client node 146, network 144 and one of the links 134 associated with the retrieving host node. If data being requested is not stored locally at the retrieving host node, but instead, is stored in the data storage system 112, the retrieving host node may request the forwarding of that data from the system 112 via the respective one of the FC links 114 with which the retrieving host node is associated and coupled.

The request forwarded via the retrieving host node is initially received by the network adapter 26 that is coupled to the FC links 114. The network adapter 26 may then forward the request to the front-end controller 24 to which it is coupled. In response to the request forwarded to it, the front-end controller 24 may then ascertain from data storage management tables (not shown) stored in the cache 16 whether the data being requested is currently in the cache 16; if the requested data is currently not in the cache 16, the front-end controller 24 may request that the disk controller (e.g., controller 18) associated with the storage devices 36 within which the requested data is stored retrieve the requested data into the cache 16. In response to the request from the front-end controller 24, the back-end controller 18 may forward via the disk adapter 30 to which it is coupled appropriate commands for causing one or more of the disk devices 36 to retrieve the requested data. In response to such commands, the devices 36 may forward the requested data to the back-end controller 18 via the disk adapter 30. The back-end controller 18 may then store the requested data in the cache 16.

When the requested data is in the cache 16, the front-end controller 22 may retrieve the data from the cache 16 and forward it to the retrieving host node via the network adapter 26 and the respective one of the links 114 to which the retrieving host node is coupled. The retrieving host node may then forward the requested data to the client node 146 that requested it via a respective one of the links 134, network is 144 and the link 145 associated with the client node 146.

Additionally, a client node 146 may forward a request to store data to a host node (e.g., one of the host nodes in the group of host nodes 124, hereinafter termed "the storing host node") via one of the links 145 associated with the client node 146, network 144 and the respective one of the links 134 associated with the storing host node. The storing host node may store the data locally, or alternatively, may request the storing of that data in the system 112 via the respective FC link, comprised in links 114, associated with the storing host node.

The data storage request forwarded via the respective FC link associated with the storing host node is initially received by the network adapter 26. The network adapter 26 may then forward the data storage request to the front-end controller 24 to which it is coupled. In response to the data storage request forwarded to it, the front-end controller 24 may then initially store the data in cache 16. Thereafter, one of the back-end controllers (e.g., controller 18) may cause that data stored in the cache 16 to be stored in one or more of the data storage devices 36 by issuing appropriate commands for same to the devices 36 via the adapter 30.

With particular reference now being made to FIG. 3, system 112 includes a plurality of electrical backplanes, including backplane 200. Backplane 200 includes a first plurality of backplane connection slots 204A . . . 204N, and a second plurality of backplane connection slots 206A . . . 206N. Each of the network adapter cards is configured and dimensioned to permit the network adapter cards to be inserted into and received by respective of the first plurality of backplane connection slots 204A . . . 204N, such that, when the network adapter cards are so inserted into and received by the slots 204A . . . 204N, the network adapter cards become electrically and mechanically coupled to the backplane 200 via the slots 204A . . . 204N. For example, network adapter cards 208, 212 are configured and dimensioned to permit cards 208, 212 to be inserted into and received by slots 204A, 204N, respectively, such that, when the cards 208, 212 are so inserted into and received by the slots 204A, 204N, the cards 208, 212 become electrically and mechanically coupled to the backplane 200 via the slots 204A, 204N. Likewise, each of the front-end controller cards is configured and dimensioned to permit the front-end controller cards to be inserted into and received by respective of the second plurality of backplane connection slots 206A . . . 206N, such that, when the front-end controller cards are so inserted into and received by the slots 206A . . . 206N, the front-end controller cards become electrically and mechanically coupled to the backplane 200 via the slots 206A . . . 206N. For example, front-end controller cards 210, 214 are configured and dimensioned to permit the front-end controller cards 210, 214 to be inserted into and received by slots 206A, 206N, respectively, such that, when the front-end controller cards 210, 214 are so inserted into and received by the slots 206A, 206N, respectively, the cards 210, 214 become electrically and mechanically coupled to the backplane 200 via the slots 206A, 206N.

Backplane 200 includes a plurality of internal electrical connections (not shown). These internal connections are configured such that, when the front-end controller and network adapter cards are properly inserted into and received by appropriate respective backplane connection slots, each front-end controller becomes electrically coupled to the respective network adapter with which it is associated. For example, when front-end controller cards 210, 214 are so inserted into and received by slots 206A, 206N, respectively, and network adapter cards 208, 212 are so inserted into and received by slots 204A, 204N, respectively, front-end controller 24 becomes electrically coupled via the backplane's internal electrical connections to its associated network adapter 26, front-end controller 22 becomes electrically coupled via these connections to its associated network adapter 28.

In system 112, with the exception of network adapter 28, each of the network adapters in the system 112 may have an identical respective conventional construction and operation; thus, only the respective construction and operation of network adapter 28 (which is constructed in accordance with this embodiment of the present invention) will be described herein. When the electrical circuit card 212 that comprises network adapter 28 is properly inserted into and received by the slot 204N, one or more (and in this embodiment, a plurality of) backplane interfaces 252 of the network adapter card 212 become electrically and mechanically coupled to the backplane 200. The interfaces 252 may comprise two sets 240 and 242 of data and control/management interfaces.

Each of the front-end controllers in system 112 may include two respective processing sections. Each of the processing sections in each respective controller may control and monitor the operation of, and exchange I/O data with circuitry comprised in respective processing domains or sections in the respective network adapter with which the respective controller is associated. For example, with reference being made to FIG. 3, controller 22 may include two respective processing sections 260 and 262, and the processing sections 260, 262 in controller 22 may control and monitor the operation of, and receive from and transmit I/O data to, respective processing domains/sections 244, 246 in control and external interface/data processing circuitry 250 in adapter 28. Each of the processing sections in each of the front-end controllers 22 . . . 24 may comprise a respective PowerPC™ microprocessor of the type manufactured by and commercially available from Motorola, Inc. of Austin, Tex., United States of America, computer-readable memory, and associated logic and related circuitry. In general, the respective computer-readable memory comprised in the respective processing sections 260, 262 in the controllers 22 . . . 24 may store software programs and data structures associated with, and for carrying out the inventive and other functions, methods, techniques, and operations described herein as being carried out by the respective processing sections; the respective processing sections may be configured to execute these software programs and manipulate these data structures, and the execution of the software programs by the respective processing sections may cause and facilitate the inventive and other functions, methods, techniques, and operations described herein as being carried out by the respective processing sections so as to implement this embodiment of the present invention. It will be apparent to those skilled in the art that many types of microprocessors and memories may be used according to the within teachings to implement this embodiment of the present invention.

When the network adapter card 212 becomes electrically and mechanically mated to the backplane 200, the interfaces 240 in adapter card 212 become electrically coupled, via the internal electrical connections in the backplane 200, to the processing section 260 in front-end controller card 214, and the interfaces 242 in adapter card 212 become electrically coupled, via these connections, to the processing section 262 in the card 214. When this occurs, the processing section 260 in controller card 214 may exchange, via the backplane 200 and interfaces 240, data and commands with the processing section 244 in adapter card 212, and the processing section 262 in controller card 214 may exchange, via the backplane 200 and interfaces 242, data and commands with the processing section 246 in adapter card 212.

The processing section 244 in the adapter 28 is coupled via the links 118 to the host nodes 128. Conversely, for reasons that are described below, the processing section 246 in the adapter 28 is coupled via the logical link 120 to the data storage system 130.

Figure 4:
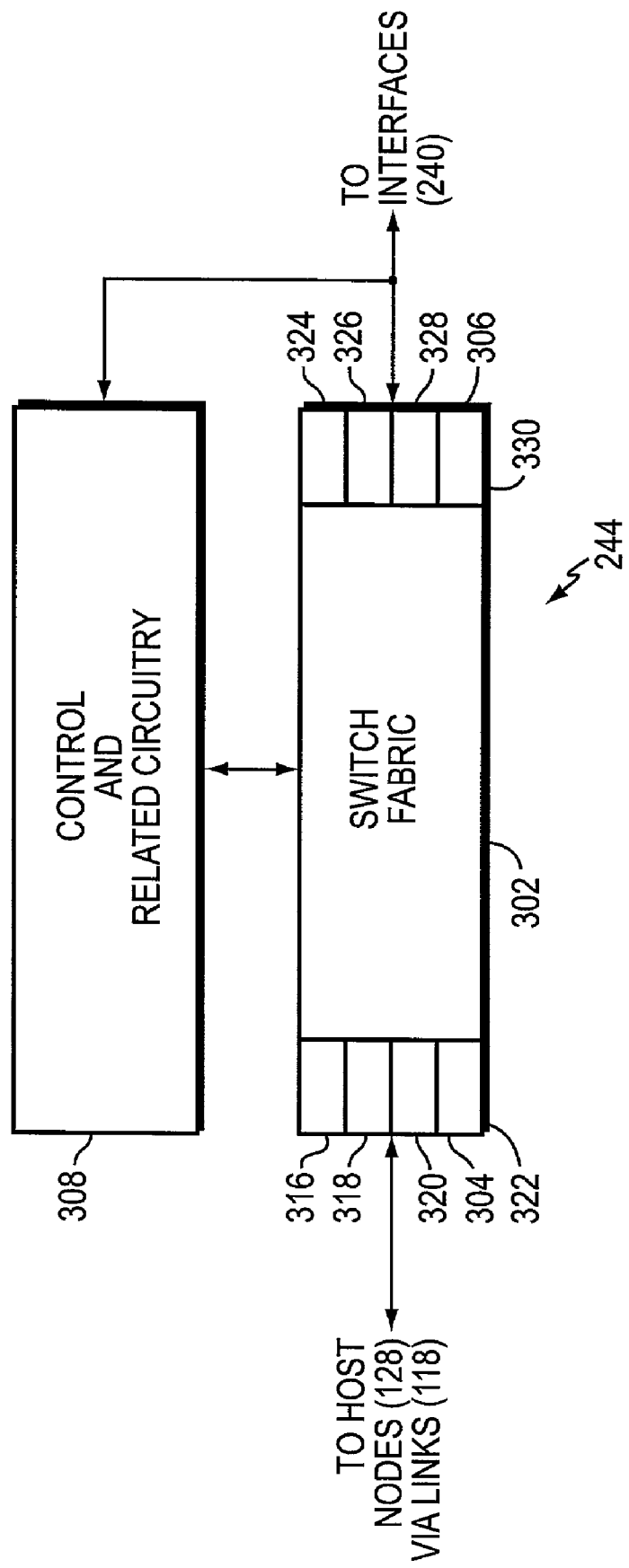
FIG. 4 is a high-level block diagram illustrating functional components of switch and control circuitry that may be comprised in a network adapter made according to one embodiment of the present invention.

As shown in FIG. 4, the processing section 244 in adapter 28 includes an FC switch fabric 302 having two sets 304, 306 of I/O ports, and control and related circuitry 308. Depending upon the particular configuration of the adapter 28, one set 304 of the switch fabric's I/O ports may comprise either twelve or twenty I/O ports that may be evenly divided among four subsets 316, 318, 320, 322 of the switch ports. In this embodiment of the present invention, the set 304 comprises twenty I/O ports. Thus, in this embodiment, each of the subsets 316, 318, 320, 322 may comprise five respective FC I/O ports. Each of the I/O ports in set 304 may be coupled to a respective one of the host nodes 128 via a respective FC link comprised in links 118. Each of the internal switch ports 324, 326, 328, and 330 comprised in other set 306 of the switch fabric's I/O ports may be coupled to a respective I/O data interface comprised in the interfaces 240.

Each subset 316, 318 320, 322 of the external switch ports 304 is logically associated with, assigned, "zoned" or mapped to a respective one of the internal switch ports 324, 326, 328, 330, respectively. In accordance with this switch port zone mapping/assignment scheme, the FC communication protocol frames received by the fabric 302 from the external ports in subset 316 may be forwarded by the fabric 302 to internal port 324; FC frames received by the fabric 302 from the external ports in subset 318 may be forwarded by the fabric 302 to internal port 326; FC frames received by the fabric 302 from the external ports in subset 320 may be forwarded by the fabric 302 to the internal port 328; FC frames received by the fabric 302 from the external ports in subset 322 may be forwarded by the fabric to the internal port 330.

Similarly, an FC frame received by the fabric 302 from internal port 324 may be forwarded by the fabric 302 to an appropriate one of the ports in the subset 316, depending upon the particular destination N_Port identifier (i.e., D_ID) associated with the frame; an FC frame received by the fabric 302 from internal port 326 may be forwarded by the fabric 302 to an appropriate one of the ports in the subset 318, depending upon the particular D_ID associated with the frame; an FC frame received by the fabric 302 from internal port 328 may be forwarded by the fabric 302 to an appropriate one of the ports in the subset 320, depending upon the particular D_ID associated with the frame; and, an FC frame received by the fabric 302 from internal port 330 may be forwarded by the fabric 302 to an appropriate one of the ports in the subset 322, depending upon the particular D_ID associated with the frame.

Switch fabric 302 may be controlled by circuitry 308, based upon signals provided, via the control interfaces comprised in the interfaces 240, to the circuitry 308 from the processing section 260 in the controller 22. More specifically, circuitry 308 may control the switching system 302 based upon signals provided to the circuitry 308 from the control interfaces comprised in the interfaces 240. In addition thereto, if circuitry 244 is appropriately configured, the circuitry 308 may control the switch fabric 302 based upon in-band control signals provided to the circuitry 244 from the processing section 260 via the data I/O interfaces comprised in the interfaces 240.

After the external ports 304 have been brought on-line (e.g., via appropriate manual intervention by a human operator), the switch ports 304 may convert respective optical FC communication signals received by the adapter 28 via the channels 118 into respective corresponding FC electrical signals that may be provided to the fabric 302. Ports 304 also may convert respective FC electrical communication signals received from the switch fabric 302 into respective corresponding optical FC communication signals that may be provided by the adapter 28 via the channels 118 to appropriate host nodes 128. The electrical FC communication signals provided to the switch fabric 302 by the ports 304 may embody and/or comprise FC communication protocol frames. These frames may be forwarded by the switch fabric 302, in accordance with well known conventional FC switching techniques and the previously described switch port zone mapping assignment scheme, to appropriate ones of the internal ports 324, 326, 328, 330. Frames received from the switch fabric 302 by the ports 324, 326, 328, 330 may be transmitted from the ports 324, 326, 328, 330 to the controller 22 via the data interfaces comprised in the interfaces 240 and the backplane 200.

Similarly, the electrical FC communication signals provided to the switch fabric 302 by the internal ports 306 may also embody FC communication protocol frames. These frames may be forwarded by the fabric 302, in accordance with well known conventional FC switching techniques and the previously described port zone mapping/assignment scheme, to appropriate ones of the external ports 304.

Figure 5:
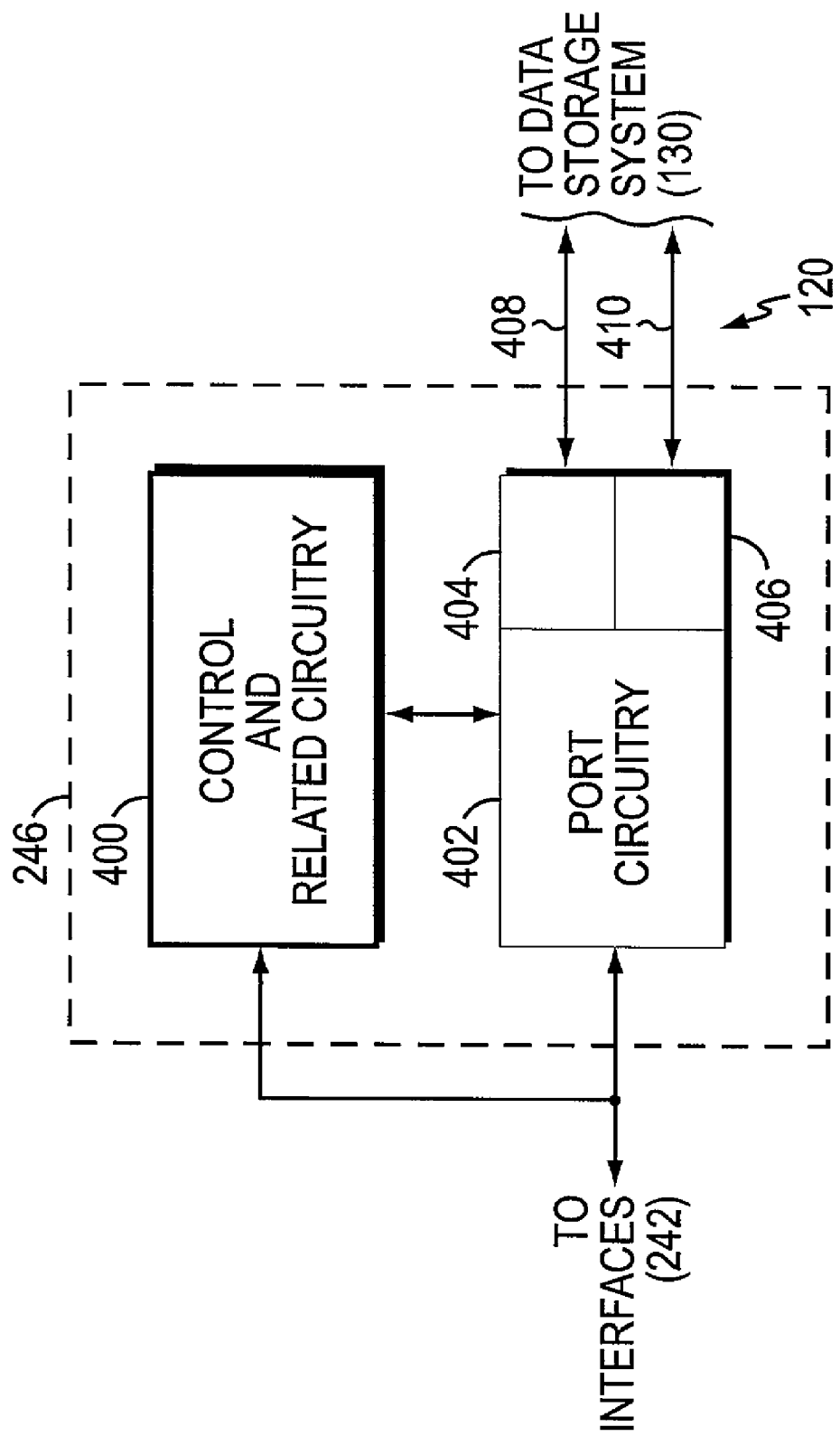
FIG. 5 is a schematic diagram illustrating circuitry in a network adapter made according to one embodiment of the present invention that may be used in data mirroring-related operations.

Turning now to FIG. 5, the construction and operation of the processing section 246 in adapter 28 will be described. Processing section 246 in adapter 28 includes data I/O port and related circuitry 402, and control and related circuitry 400. The control circuitry 400 may control and monitor the operation of the port circuitry 402 based upon control signals provided, via the control interfaces comprised in the interfaces 242 and the backplane 200, to the control circuitry 400 from the processing section 262 in the front-end controller 22. Circuitry 402 may be coupled to the target data storage system 130 via a single logical link 120.

More specifically, port circuitry 402 may include an initially active, primary data I/O port 404 and a redundant/backup data I/O port 406. This initially active, primary port 404 in the processing section 246 in adapter 28 may be coupled, via an initially active, primary data mirroring communication link 408 comprised in the logical link 120, to a corresponding initially active, primary data I/O port (not shown) in a network adapter (also not shown) in the target system 130. That is, although in the interests of clarity of illustration such is not shown in the Figures, the target system 130 may be provisioned with at least as much user-accessible mass storage space as the source system 112, and may, in general, otherwise have a construction/operation similar to system 112; primary port 404 in the processing section 246 in adapter 28 in system 112 may be coupled via the initially active, primary data mirroring network communication link 408 to the corresponding primary I/O port in an identically configured network adapter (not shown) in the target system 130; similarly, the secondary or backup/redundant port 406 in the processing section 246 in the adapter 28 in source system 112 may be coupled via the secondary or backup/redundant data mirroring network communication link 410 to a corresponding secondary or backup/redundant port (not shown) in said identically configured network adapter in the target system 130. Thus, the primary port 404 in section 246 in adapter 28 in the source system 112, primary link 408, and the (not shown) corresponding primary data I/O port in the (not shown) corresponding network adapter in the target system 130 together may constitute a primary data communication path between the source data storage system 112 and the target data storage system 130, for use in carrying out data communication related to mirroring-related operations involving the systems 112 and 130. The secondary/redundant port 406 in section 246 in adapter 28 in the source system 112, secondary/redundant link 410, and the (not shown) corresponding secondary/redundant data I/O port in the (not shown) corresponding network adapter in the target system 130 together may constitute a secondary/redundant data communication path between the source data storage system 112 and the target data storage system 130, for use in carrying out such data communication in the event of failure/unintended interruption in the data communication afforded by the primary communication path. The circuitry comprised in the processing section 246 in the adapter 28 in the source system 112 (as well as, the circuitry comprised in the corresponding, not shown processing section in the not shown corresponding network adapter in the target system 130) may be configured to use conventional techniques to detect failure/unintended interruption in the data communication afforded by the primary communication path between the source system 112 and the target system 130, and in the event of such failure/unintended interruption in such communication, to utilize the secondary/redundant communication path between the source system 112 and the target system 130 for carrying out such communication, instead of utilizing the primary communication path for carrying out such communication.

Each of the links 408, 410 may comprise a respective ESCON or FC communication channel. The port circuitry 402 in the adapter 28 in the source system 112, and the not shown corresponding port circuitry in the not shown corresponding network adapter in the target system 130 to which the port circuitry 402 in adapter 28 in system 112 may be coupled via the link 120, may be configured to exchange data and commands involved with, and for facilitating the execution of, data mirroring-related operations involving the systems 112 and 130, using the respective communications channels that may be comprised in the links 408,410.

Figure 6:
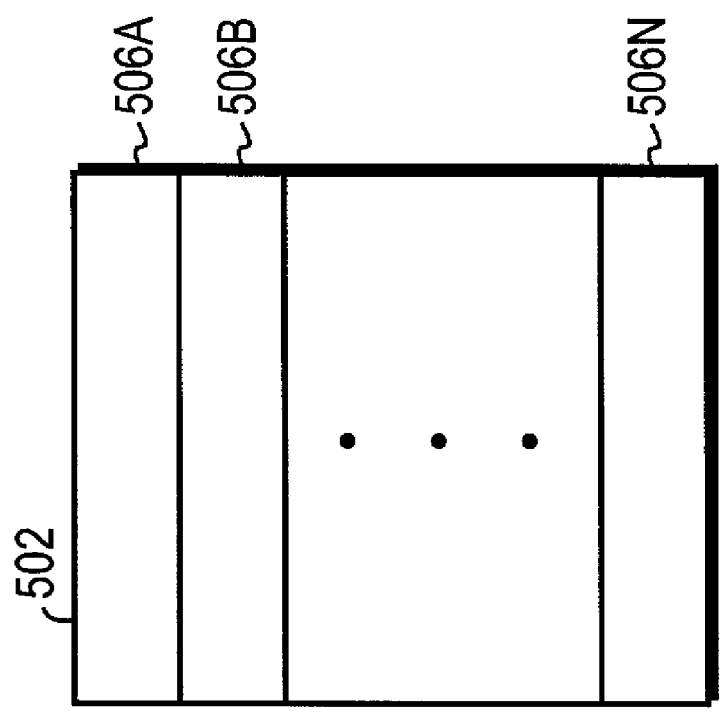
FIG. 6 is a schematic diagram for use in facilitating description of data mirroring-related operations that may be facilitated by the circuitry shown in FIG. 5.
Figure 6:
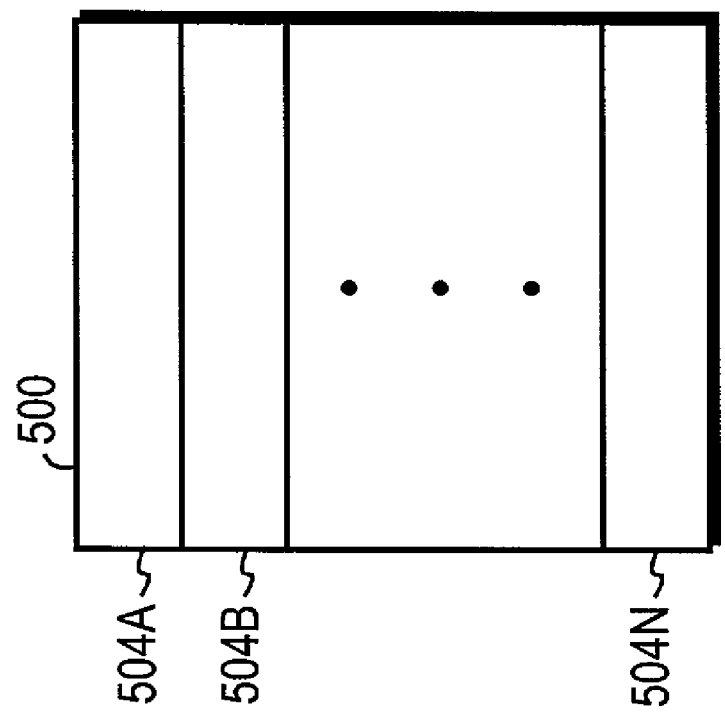

FIG. 6 is a highly schematic block diagram for use in facilitating description of data mirroring-related operations that may involve the source data storage system 112 and the target data storage system 130 in the network 110. In source system 112, each of the disk mass storage devices 34 . . . 36 may have a respective storage space that may be accessed by users (e.g., via read/write access requests issued from host nodes 124, 126, and 128 to the system 112. The sum total of the user-accessible storage space comprised in the disk mass storage devices 34 . . . 36 in source system 112 may be logically divided, using conventional techniques, into one or more, and in this embodiment of the present invention, a plurality of logical volumes. Each such logical volume may span one or more respective physical disk mass storage devices in source system 112. One or more, and in this embodiment of the present invention, all of these logical volumes may be mirrored in target system 130; the logical volumes comprised in source system 112 that are mirrored in the target system 130 in data storage network 110 are symbolically illustrated by the block referred to by numeral 500 in FIG. 6, and are hereinafter collectively referred to as "mirrored logical volumes" in source system 112. The respective individual logical volumes that are comprised in the mirrored logical volumes 500 in source system 112 are illustrated by the blocks referred to by the numerals 504A, 504B, . . . 504N, respectively, in FIG. 6. The logical volumes stored in the target system 130 that may correspond to the mirrored logical volumes 500 in source system 112 are symbolically illustrated as the block referred to by the numeral 502 in FIG. 6, and are referred to as "mirrored logical volumes" in system 130. Mirrored logical volumes 502 in target system 130 comprise respective individual logical volumes 506A, 506B . . . 506N. The logical volumes 506A, 506B, . . . 506N correspond to, and are exact replicas of, logical volumes 504A, 504B, . . . 504N, respectively. The logical volumes 506A, 506B, . . . 506N may be thought of as comprising or constituting one or more respective logical target devices in a single logical target device group, and the logical volumes 504A, 504B, . . . 504N may be thought of as comprising or constituting one or more respective logical source devices in a single logical source device group; this logical target device group in the target system 130 may be a mirror of the logical source device group in the source system 112.

The primary and secondary communication paths may be used to facilitate the exchange of data and commands necessary to implement conventional data mirroring and recovery techniques. These techniques, these types of data and commands, and the processing thereof necessary to implement such techniques are disclosed in e.g., Yanai et al., U.S. Pat. No. 5,742,792, issued Apr. 21, 1998, entitled "Remote Data Mirroring," and Ofek, U.S. Pat. No. 6,101,497, issued Aug. 8, 2000, entitled "Method and Apparatus For Independent and Simultaneous Access To A Common Data Set." The aforesaid U.S. Pat. Nos. 5,742,792 and 6,101,497 are owned by the owner of subject application, and are hereby incorporated by reference into the subject application in their entireties.

The aforesaid types of data and commands may be exchanged, using the primary and secondary communication paths, between the source system 112 and the target system 130, in accordance with such conventional data mirroring and recovery techniques, so as to implementation of conventional data mirroring and recovery techniques. Using such techniques, as well as the primary and secondary communication paths, the source system 112 may cause the logical volumes 500 to be mirrored, as logical volumes 502, in the disk mass storage devices (not shown) in the target system 130, and also using such techniques and the primary and secondary communication paths, these mirrored volumes in the source system 112 and target system 130 may be used in conventional data recovery-related operations, e.g., of the type disclosed in the aforesaid U.S. Pat. Nos. 5,742,792 and 6,101,497.

The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, although the cache 16, back-end controllers 18 . . . 20, and front-end controllers 22 . . . 24 have been described as being coupled via bus system 14, if system 112 is appropriately modified, the cache 16, front-end controllers 18 . . . 20, and back-end controllers 22 . . . 24 may be coupled together and communicate via a matrix of point-to-point data transfer and messaging systems, e.g., of the type disclosed in copending U.S. patent application Ser. No. 09/745,814 entitled, "Data Storage System Having Crossbar Switch With Multi-Staged Routing," filed Dec. 21, 2000; this copending application is owned by the Assignee of the subject application, and is hereby incorporated by reference herein in its entirety.

Other modifications are also possible. For example, although not shown in the Figures, if the card 212 is appropriately modified, respective functionalities of the processing sections 244 and 246 may be merged such that each of the processing sections 244 and 246 may comprise respective FC switch fabric circuitry, control and related circuitry, and port circuitry that may be configured to permit each of the processing sections 244 and 246 to exhibit an identical respective functionality that may permit some or all of the external switch ports in the respective FC switch fabric circuitry to be used in remote mirroring operations of the types previously described. In accordance with this modification, the number of external switch ports that may be comprised in each of the respective processing sections 244 and 246 (when modified as set forth above) may be reduced compared to the number of such external switch ports as described in connection with the embodiment of card 212 illustrated in FIG. 5. Further alternatively, if the card 212 is appropriately modified, the card 212 may comprise only a single processing section (not shown) that may comprise FC switch fabric circuitry, control and related circuitry, and port circuitry that may be configured to permit some or all of the external switch ports in the FC switch fabric circuitry in the card 212 as so modified to be used in remote mirroring operations of the types previously described. Yet further alternatively, the card 212 may be modified in accordance with the teachings disclosed in the aforesaid co-pending U.S. patent application Ser. No. 09/767,773, whereby to enable the card 212 so modified to be used in remote mirroring operations in a switching environment as disclosed in the aforesaid co-pending U.S. patent application Ser. No. 09/767,773.

Yet other modifications are also possible. Accordingly, the present invention should be viewed broadly as encompassing all modifications, variations, alternatives and equivalents as may be encompassed by the hereinafter-appended claims.

What is claimed is:

1. A network adapter capable of being used to interface to a network environment a data storage system input and output (I/O) controller, the data storage system I/O controller residing in a first network data storage system, the network environment being external to the network data storage system, the network adapter comprising:

an interface capable of being used to couple the network adapter to the data storage system I/O controller via a backplane in the first data storage system, the interface comprising first and second data and control and management (control/management) interfaces, thereby enabling multiple processing elements within the data storage system I/O controller to interact with respectively connected elements within the network adapter;

a switching system capable of being coupled to data exchanging devices in the network environment, the switching system being coupled to the data storage system I/O controller via the first data and control/management interface on the network adapter;

port circuitry capable of being used to facilitate establishment of a link between the first network data storage system and a second network data storage system in the network environment, the second network data storage system being remote from the first network data storage system, the link, when established, facilitating establishment of a target device in the second network data storage system as a data mirroring device capable of comprising a mirror of data residing in a source device in the first network data storage system, said port circuitry being connected to the data storage system I/O controller via the second data and control/management interface on the network adapter; and wherein data is sent from a host computer through a second switching system in the network environment to the network adapter, which allows the data to be sent from the network adapter to the second network data storage system without passing through the second switching system.

2. The network adapter of claim 1, wherein the switching system comprises a fibre channel switching fabric.

3. The network adapter of claim 1, wherein the network adapter is an electrical circuit card that is configured to be electrically and mechanically coupled to the backplane.

4. The network adapter of claim 1 wherein the source device and the target device comprise respective logical data volumes.

5. A circuit card configured to be inserted into and received by a circuit card slot in a first network data storage system, the circuit card comprising:
   an interface capable of being coupled via signal transmission system of the first network data storage system to an input and output (I/O) controller of the first network data storage system when the circuit card is inserted into the circuit card slot, the interface comprising first and second data and control and management control/management interfaces, thereby enabling multiple processing elements within the data storage system I/O controller to interact with respectively connected elements within the network adapter;
   a switch that may be coupled to data exchanging devices external to the circuit card and the first network data storage system, and that may be coupled to the I/O controller via the first data and control/management interface when the circuit card is inserted into the circuit card slot;
   port circuitry that may be used to facilitate establishment of a link between the first network data storage system and a second network data storage system, the link, when established, facilitating data transmission from a source device to a target device, the source device being in the first network data storage system, the target device being in the second network data storage system and being used to mirror data residing in the source device, said port circuitry being connected to the data storage system I/O controller via the second data and control/management interface on the network adapter; and wherein data is sent from a host computer through a second switching system in the network environment to the network adapter, which allows the data to be sent from the network adapter to the second network data storage system without passing through the second switching system.

6. The circuit card of claim 5, wherein the switch comprises a fibre channel switch.

7. The circuit card of claim 5, wherein the source device and the target device comprise respective logical data volumes.

8. The circuit card of claim 5, wherein the second network data storage system is geographically remote from the first network data storage system.

9. A method of using a network adapter that may be used to interface to a network environment a data storage system input and output (I/O) controller, the data storage system (I/O) controller residing in a first network data storage system, the network environment being external to the first network data storage system, the network adapter including an interface, a switching system, and port circuitry, the method comprising:
   coupling the interface to the data storage system (I/O) controller via a backplane in the first network data storage system, the interface comprising first and second data and control and management interfaces, thereby enabling multiple processing elements within the data storage system I/O controller to interact with respectively connected elements within the network adapter;
   coupling the switching system to data exchanging devices in the network environment, the switching system being coupled to the data storage system (I/O) controller when the interface couples the adapter to the data storage system (I/O) controller via the first data and control/management interface;
   using the port circuitry to facilitate establishment of a link between the first network data storage system and a second network data storage system in the network environment, the second network data storage system being remote from the first network data storage system, the link, when established, facilitating establishment of a target device in the second network data storage system as a data mirroring device that may comprise a mirror of data residing in a source device in the first network data storage system, said port circuitry being connected to the data storage system I/O controller via the second data and control/management interface on the network adapter; and wherein data is sent from a host computer through a second switching system in the network environment to the network adapter, which allows the data to be sent from the network adapter to the second network data storage system without passing through the second switching system.

10. The method of claim 9, wherein the switching system comprises a fibre channel switching fabric.

11. The method of claim 9, wherein the network adapter is an electrical circuit card that is configured to be electrically and mechanically coupled to the backplane.

12. The method of claim 9, wherein the source device and the target device comprise respective logical data volumes.

13. A method of using a circuit card configured to be inserted into and received by a circuit card slot in a first network data storage system, the circuit card including an interface, a switch, and port circuitry, the method comprising:
   coupling the interface via signal transmission system of the first network data storage system to an input and output (I/O) controller of the first network data storage system when the circuit card is inserted into the circuit card slot, the interface comprising first and second data and control and management control/management interfaces, thereby enabling multiple processing elements within the data storage system I/O controller to interact with respectively connected elements within the network adapter;
   coupling the switch to data exchanging devices external to the circuit card and the first network data storage system, and the switch also being coupled to the I/O controller via the first data and control/management interface when the circuit card is inserted into the circuit card slot;
   using the port circuitry to facilitate establishment of a link between the first network data storage system and a second network data storage system, the link, when established, facilitating data transmission from a source device to a target device, the source device being in the first network data storage system, the target device being in the second network data storage system and being used to mirror data residing in the source device, said port circuitry being connected to the data storage system I/O controller via the second data and control/management interface on the network adapter; and wherein data is sent from a host computer through a second switching system in the network environment to the network adapter, which allows the data to be sent from the network adapter to the second network data storage system without passing through the second switching system.

14. The method of claim 13, wherein the switch comprises a fibre channel switch.

15. The method of claim 13, wherein the source device and the target device comprise respective logical data volumes.

16. The method of claim 13, wherein the second network data storage system is geographically remote from the first network data storage system.

* * * * *